United States Patent

[11] 3,630,072

| [72] | Inventor | Alfred E. Traver<br>Great Neck, N.Y. |
|---|---|---|
| [21] | Appl. No. | 33,460 |
| [22] | Filed | Apr. 30, 1970 |
| [45] | Patented | Dec. 28, 1971 |
| [73] | Assignee | Mobil Oil Corporation<br>New York, N.Y. |

[54] HYDROCARBON EMISSIONS COMPUTER
9 Claims, 3 Drawing Figs.

[52] U.S. Cl. ..................................................... 73/23,
235/151.3
[51] Int. Cl. ........................................................ G01n 23/02,
G06g 7/48
[50] Field of Search ......................................... 73/23, 19,
117.3, 117.2, 117, 116; 235/150.4, 151.3, 151.35,
150.2

[56] References Cited
UNITED STATES PATENTS

| 2,968,181 | 1/1961 | Mittelmann .................. | 235/151.3 X |
| 3,237,448 | 3/1966 | Howell et al. ................. | 73/117.2 X |
| 3,406,562 | 10/1968 | Perna et al. ................... | 73/23 |
| 3,517,177 | 6/1970 | Crowell ........................ | 73/116 X |

*Primary Examiner*—Richard C. Queisser
*Assistant Examiner*—Ellis J. Koch
*Attorneys*—Oswald G. Hayes, Andrew L. Gaboriault and James F. Powers, Jr.

ABSTRACT: Method and apparatus for providing a hydrocarbon emission rating for an exhaust of an engine comprising means for adding hydrocarbon emission readings as they are generated during operation of the engine through a plurality of modes including acceleration, deceleration and cruise.

HYDROCARBON EMISSIONS COMPUTER

BACKGROUND OF THE INVENTION

1. Field of the Invention

The present invention relates to a method and apparatus for adding a plurality of values. More particularly, it relates to a computing method and device for measuring exhaust emissions from internal combustion engines.

2. Description of the Prior Art

In an attempt to minimize air pollution, several states have set limits in the amount of permissible exhaust emissions from motor vehicles. In particular, California requires that vehicle emissions of hydrocarbon, carbon monoxide and carbon dioxide not exceed a predetermined maximum when the car is operated on a chassis dynamometer through a seven-mode cycle which includes acceleration, cruise, deceleration and idle through preset ranges and for predetermined time periods. The California predetermined limits and seven-mode cycle is being generally accepted by other states as a realistic standard for motor vehicles. However, the California seven-mode cycle is time consuming.

In an effort to reduce the time required to determine the rate of vehicle emissions, several cycles having reduced number of modes have been proposed. Each of these cycles require the solution of a unique equation having weighted factors for predicting or correlating the cycle to the California cycle. For example, a three-mode cycle devised by Mobil Oil Corporation provides for monitoring the exhaust of a motor vehicle while it is being operated on a chassis dynamometer equipped with a flywheel equivalent to 3,500 lbs. of vehicle weight. A hydrocarbon emissions detector, such as an ultraviolet detector, is connected to the exhaust of the engine.

The Mobil cycle comprises a first mode of obtaining a steady speed of 50 m.p.h. with the flywheel engaged and the dynamometer loaded to obtain 10 inches Hg vehicle intake manifold vacuum. The 50 m.p.h. cruise is carried out for a minimum of 30 seconds, and the lowest steady state value is obtained from the output of the ultraviolet instrument and recorded for later use.

The second mode of the Mobil cycle consists of unloading the dynamometer with the flywheel engaged and decelerating from 50 m.p.h. The vehicle is then accelerated at 10 inches Hg intake manifold vacuum against flywheel inertia from the lowest obtainable speed in high gear to 60 m.p.h. The lowest reading obtained at the output of the ultraviolet instrument is recorded for future use.

The third mode of the Mobil cycle consists of decelerating from the second mode with the flywheel engaged and against a closed throttle, and the highest or peak reading obtained by the ultraviolet instrument is recorded.

To predict the California cycle based on the foregoing Mobil three-mode cycle, the three readings are used to solve the following equation.

$$Ln Y = 4.310 + 0.012 X_1 + 0.0081 X_2 + 0.014 X_3$$

wherein:
$Y$ = p.p.m., unburned hydrocarbons
$X_1$ = acceleration to 60 m.p.h., percent absorption shown by ultraviolet instrument reading,
$X_2$ = steady—50 m.p.h., percent absorption shown by ultraviolet instrument reading,
$X_3$ = deceleration from 60 m.p.h., percent absorption shown by ultraviolet instrument reading.

Another rapid cycle for predicting the California cycle is described in a paper entitled *New Jersey's Rapid Inspection Procedures for Vehicular Emissions*, by J. N. Pattison, C. Fegraus, A. J. Andreatch and J. C. Elston which was presented to the Society of Automotive Engineers at Detroit, Michigan on Jan. 11, 1968. The New Jersey cycle described in the paper consists of four modes wherein the vehicle was first accelerated from 0 to 30 m.p.h. over a period of 14 seconds, and in the second mode the vehicle cruised at 30 m.p.h. for a period of 16 seconds. The third mode comprised deceleration from 30 to 0 m.p.h. over a span of 14 seconds, and in the final mode the vehicle idled for 16 seconds. To correlate the cycle to that of the California cycle, the following equation was proposed at the Jan. 1968 meeting.

$$Y = 0.7 ACC + 0.15 CR + 0.1 DEC + 0.05 IDLE$$

wherein:
$Y$ = p.p.m., unburned hydrocarbons
$ACC$ = p.p.m., mode 1 acceleration
$CR$ = p.p.m., mode 2 cruise
$DEC$ = p.p.m., mode 3 deceleration
$IDLE$ = p.p.m., mode 4 idle.

There are other known cycles for predicting the California cycle with varying degrees of accuracy. As with the Mobil and the New Jersey cycle, each cycle requires the solution of an equation having weighting factors which have been derived through experimentation.

SUMMARY OF THE INVENTION

In accordance with the present invention there is provided an apparatus and a method for automatically computing a cycle for predicting the California cycle.

The apparatus of the present invention for determining the total hydrocarbon emission count of a vehicle when operated through a plurality of modes including acceleration, deceleration and cruise comprises means for generating a signal representative of the hydrocarbon emission count of one of the modes, and means including a capacitor for storing a voltage representative of the count signal. Means are provided for changing the voltage on the capacitor from the stored voltage to a predetermined value, and means for adjusting the rate of capacitor voltage change by a mode factor. Also provided are means for generating a function representative of the amount of time to change the voltage on the capacitor to the predetermined value, and means for displaying in response to the time function a representation of the hydrocarbon count as modified by the mode factor. Additional means are also provided for adjusting the rate of voltage change to the predetermined value by different mode factors. Further, the apparatus includes means for adjusting the displaying means in response to each generated time function to arithmetically add all hydrocarbon counts as modified by their respective mode factors.

In accordance with another aspect of the invention, there is provided a method of testing a vehicle for hydrocarbon emissions comprising sequentially operating the vehicle through a plurality of modes including acceleration, deceleration and cruise. A signal representative of the hydrocarbon count for one of the modes is generated and stored on a capacitor. The capacitor charge is changed from the stored value to a predetermined value, and the rate of change is adjusted by a predetermined mode factor. A function representative of the amount of time to change the capacitor to the predetermined value is generated, and the hydrocarbon count as modified by the predetermined mode factor is displayed in response to the generated time function. The foregoing steps from generating a signal through generating the time function are repeated for each of the remaining modes, and the displayed representation is adjusted in response to each generated time function to arithmetically add all hydrocarbon counts as modified by their respective mode factors.

DESCRIPTION OF SPECIFIC EMBODIMENTS

Figure 1:
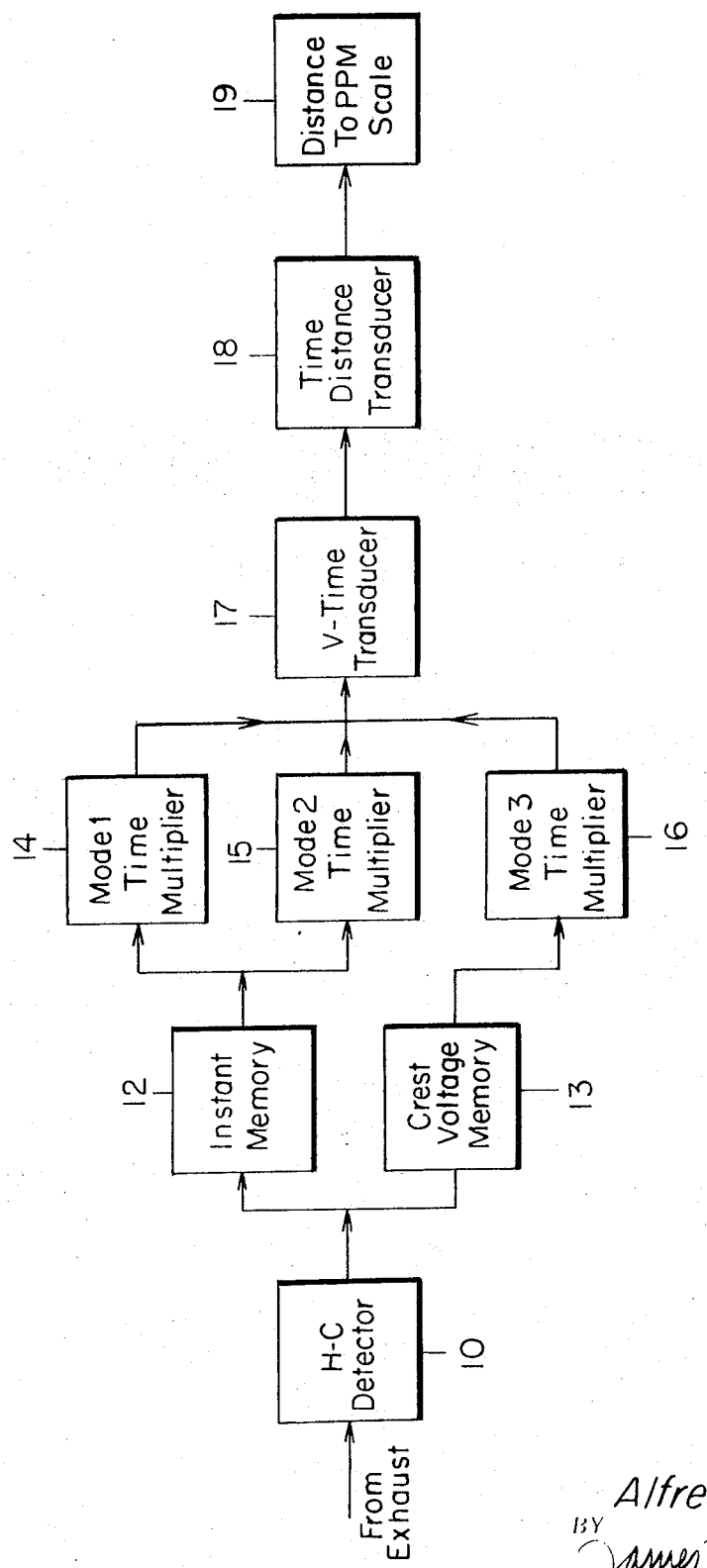
FIG. 1 shows in block form an embodiment of the present invention.

FIG. 1 is a flow diagram of a special purpose computer for carrying out the Mobil cycle for predicting the results of the California cycle. With reference to FIG. 1, a hydrocarbon emissions detector 10 is supplied with a sample of the exhaust from an engine under test and provides as an output a voltage representative of the hydrocarbon count. When the engine is being operated on the first mode of a steady speed of 50 m.p.h., a voltage representative of the lowest steady state value of the hydrocarbon count is impressed across an instant memory 12 which may be a capacitor circuit. The value of the voltage impressed across the capacitor is at some value less than a predetermined maximum, for example, less than 2.5 volts. At the end of a predetermined period of time, a time multiplier 14 disconnects the capacitor from the hydrocarbon detector 10 and provides a source of charging voltage to the instant memory 12 through a resistor circuit which compensates for the 0.0081 coefficient in the Mobil equation. Simultaneously, the time multiplier 14 actuates a voltage to time transducer 17 which may comprise a circuit including a synchronous motor. Actuation of the voltage to time transducer 17 initiates a time to distance transducer 18 which may comprise a drum driven by the motor at a predetermined rate. The scale is represented in FIG. 1 as a distance to parts per million scale 19. The scale 19 which is a natural log scale for the Mobil cycle, may be imposed upon the drum which is rotated by the time to distance transducer 18. When the instant memory 12 is charged to the predetermined voltage, e.g., 2.5 volts, the system is deactivated by stopping the time multiplier 14, for example, by opening a relay at which time the scale stops moving. The distance that the natural log scale moves is thus representative of the lowest steady state hydrocarbon count obtained in mode 1 of the Mobil cycle, as modified by the 0.0081 mode 1 factor.

The hydrocarbon count of mode 2 wherein the dynamometer simulates acceleration to 60 m.p.h. is represented on the scale 19 in an identical manner as described hereinabove with reference to mode 1. The only difference is that the mode 2 time multiplier 15 will include a compensating factor corresponding to the 0.012 coefficient or factor. This compensation may be carried out by a resistor circuit having a resistance different than that of the mode 1 time multiplier 14. In mode 2 the scale 19 is driven from a point at which it stopped at the end of mode 2 until the system is deactivated at the end of mode 2. Thus, the natural log scale 19 adds a representation of the hydrocarbon count of mode 2, as modified by the mode 2 factor, to that of mode 1.

Mode 3 requires that the peak reading be obtained during deceleration from 60 m.p.h. This function is carried out by a crest voltage memory 13 which may include a circuit including the capacitor suggested by the instant memory 12. At the end of a predetermined period of time, mode 3 time multiplier 16 disconnects the crest voltage memory 13 from the detector 10 and initiates the time transducer 17, distance transducer 18 and natural log scale 19 as described hereinabove with respect to mode 1. Mode 3 time multiplier 16 also varies the peak reading by an amount corresponding to 0.014 coefficient or factor of the Mobil equation. As described with reference to mode 1, the scale 19 will move until the capacitor in the crest voltage memory 13 is charged to 2.5 volts at which time the system is deactivated. Thus, at the end of mode 3 the scale will have moved a distance representative of the addition of the hydrocarbon counts of modes 1, 2 and 3 modified by their respective coefficients.

To compensate for the 4.310 factor, the scale may be moved to represent $Ln4.310$ prior to the beginning of mode 1 or the scale may begin at a value of $Ln4.310$.

Figure 3:
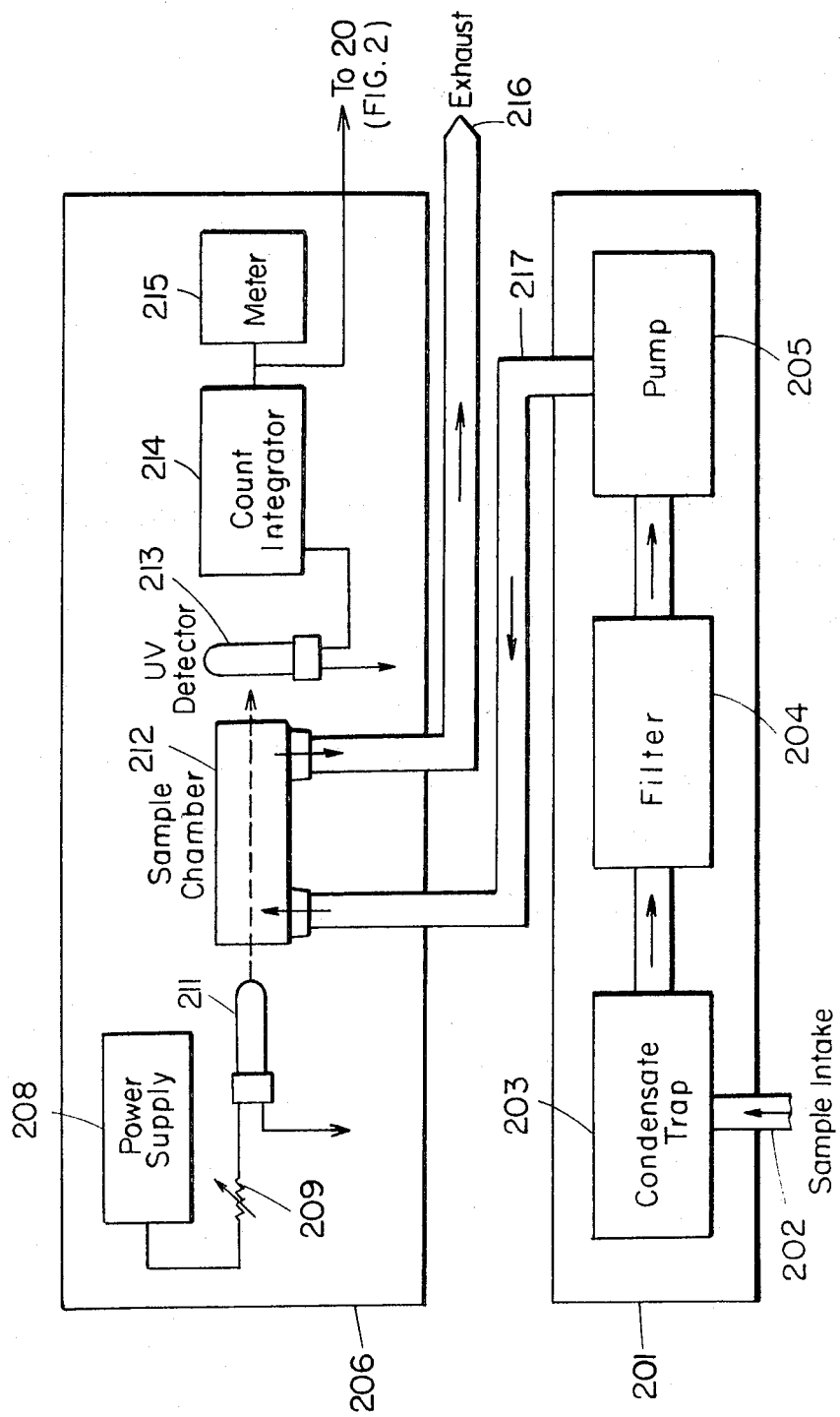
FIG. 3 is a block diagram of a hydrocarbon detector suitable for use with the embodiment of FIG. 2.

A suitable hydrocarbon detector, which will be described hereinafter with reference to FIG. 3, generates a signal which varies between 0 and 2.5 volts. 2.5 volts on this detector represents 0 percent absorption of ultraviolet light by the exhaust and 0 volts represents full excursion or 100 percent absorption of ultraviolet light by hydrocarbons in the exhaust. Thus, the amount of hydrocarbons in the exhaust varies inversely with the voltage output of this detector. Therefore, the memories 12, 13 are charged to 2.5 volts to generate a function of the percent absorption.

Thus, the present invention provides for transferring the hydrocarbon detector 10 output voltage to a memory capacitor in modes 1 and 2, and for providing a voltage representative of the peak voltage output of the detector 10 across the capacitor are modified by a multiplier corresponding to the respective coefficients of the unknown in the Mobil cycle used for predicting the California cycle. In each mode, the modified voltage is converted to an equivalent time period, and the time period is then converted to an equivalent distance. The equivalent distances are then added to solve the equation for predicting the California cycle by merely reading the final position of the scale 19.

Figure 2:
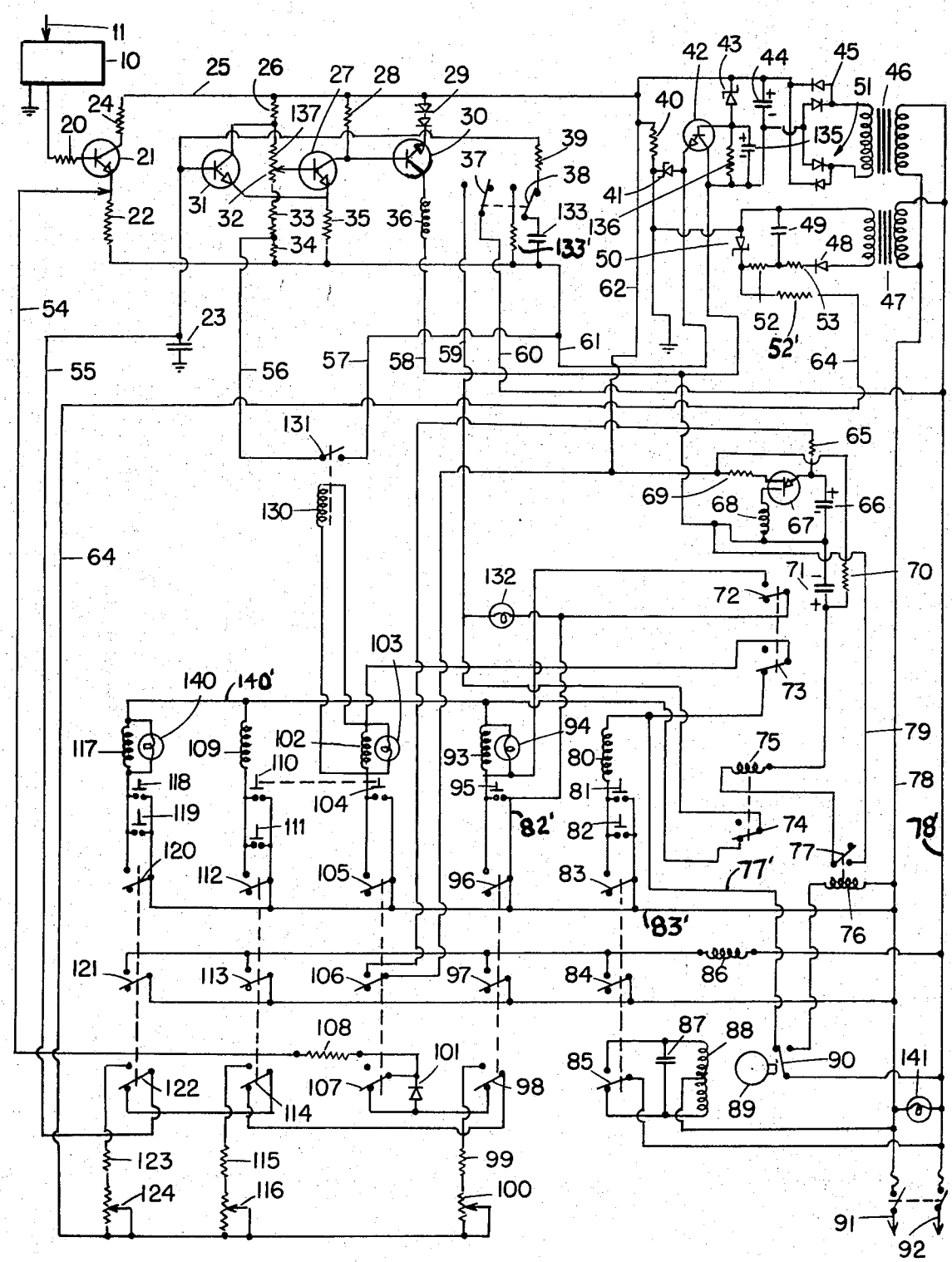
FIG. 2 is a circuit diagram of a special purpose computer constructed in accordance with the present invention.

A more detailed schematic of a special purpose computer is shown in FIG. 2. With reference to FIG. 2, an exhaust 11 from an engine is applied to the hydrocarbon detector 10 which generates a voltage output representative of parts per million hydrocarbon count to a resistor 20. The resistor 20 is connected to the base of an emitter follower or current amplifier 21. The emitter of the emitter follower 21 is connected to a potentiometer 22 which, in turn, is connected to an instant memory or memory capacitor 23 via a circuit including line 54, resistor 108, switch arms 98, 107, 114 and 122, and a line 55. The voltage on the memory capacitor 23 will vary proportionally to the voltage output from the hydrocarbon detector 10.

In the first mode of the Mobil cycle, the vehicle is operated at 50 m.p.h. cruise for at least 30 seconds. At the end of this predetermined time, the mode 1 time multiplier is actuated by closing pushbuttons 118, 119 which applies power from one terminal 91 of a 120 VAC power source along line 83' to one side of a relay 117, and power from the other terminal 92 of the power supply along line 78', a line 60, a normally closed contact arm (in position not shown) 37, a line 59, a normally closed contact arm 74, and a line 140' to the other terminal of the relay 117. Actuation of the relay 117 moves all of its contacts 120, 121, 122 to the position now shown in FIG. 2.

Movement of the contact 122 to the position not shown in FIG. 2 disconnects the instant memory or memory capacitor 23 from the hydrocarbon detector 10 and applies it to a source of charging voltage. The charging voltage source includes the 120 VAC power source 91, 92, lines 78, 78', transformer 47, and a regulated power supply comprising a zener diode 50, resistors 52, 53, and a rectifier circuit of a diode 48 and a capacitor 49. The output from the regulated power supply is applied to the memory capacitor 23 through a resistor 52', a line 64, a variable resistor 124, a resistor 123, contact 122 in the position not shown, and the line 55. By varying the value of the resistor 124, the time needed to charge the capacitor 23 to a predetermined value, e.g., 2.5 volts, from the charge applied thereto by the output of the hydrocarbon detector 10 may be thereby varied to compensate for the 0.0081 coefficient in the Mobil equation.

Movement of the contact arm 121 to the position not shown upon actuation of the relay 117, actuates a voltage to time transducer by applying power to a solenoid 86 which releases a normally biased brake on a timer motor 89 to release the brake and start the time run down of the motor. The timer motor 89 is a reversible synchronous motor powered by a circuit including a coil 88 and a capacitor 87. When the contact arm 85 is in a position shown, the motor 89 drives a time to distance transducer or drum having the scale thereon which indicates the hydrocarbon count in parts per million. The motor 89 continues to rotate the drum at a predetermined rate until the memory capacitor 23 is charged to the predetermined value.

The upper contact 120 of the relay 117 is a holding contact which when moved to the position not shown applies power to the coil of the relay 117, and therefore permits the buttons 118, 119 to be pushbuttons.

When the memory capacitor 23 reaches the predetermined value, e.g., 2.5 volts, a Schmidt trigger comprising transistors 31, 27 is actuated. The predetermined voltage applied to the base of the transistor 31 turns transistor 31 on, which, in turn, turns the transistor 27 off. When the transistor 27 is turned off, the base of a power amplifier transistor 30 is connected via a resistor 28 and a pair of diodes 29 to its emitter to thus turn the power amplifier 30 off. When the power amplifier 30 turns off, it deactivates a relay 36 which moves contacts 37, 38 to the position shown in FIG. 2. Movement of the contact arm 37 to the position shown acts to remove power from the relay 117, and thus deactivates the relay 117 and moves the contact arms 120, 121, 122 to the positions shown in FIG. 1. Movement of the contact arm 133 to the position shown provides a discharge path through a resistor 39 for the memory capacitor 23 to partially discharge the capacitor 23; and thus reset the Schmidt trigger 31, 27; to turn on the power amplifier 30; and to activate the relay 36 to move the contact arms 37, 38 to the positions not shown.

When power is removed from the coil of the solenoid 117, the contact arm 121 moves to the position not shown to remove power from the solenoid 86 and thus permit the normally biased brake to stop the motor 89. Similarly, deactivation of the coil 117 moves the holding contact arm 120 to the position not shown.

Thus, the drum with the parts per million $Ln$ scale thereon will have turned at a predetermined rate for the length of time needed to charge the capacitor 23 to the predetermined value. The scale will thus indicate in parts per million the $0.0081\ X_2$ term of the equation for predicting the California cycle.

The vehicle is then operated through the second mode of the Mobil cycle, and a charge is impressed on the memory capacitor 23 representative of the lowest output from the hydrocarbon detector 10 during acceleration. Then pushbuttons 110, 104 are depressed to supply power to a relay 109 through the normally closed contact arms 74 and 37 as described hereinabove with reference to mode 1. Simultaneously, power is applied to a pair of relays 102 and 130 from the power supply 91, 92 by a line 83' and a line 94', a normally closed contact arm 73, a line 77', and the contact arm 90 in the position shown.

Actuation of the relay 109 moves the contact arms 112, 113, 114 to the position not shown in FIG. 2. Such movement of contact arm 112 provides a holding action for the relay 109, and actuation of the arm 113 to the position now shown supplies power to the solenoid coil 86 which acts to release the brake in the timer motor 89 and permit the motor to drive a drum in the manner described hereinabove with reference to the first mode.

Movement of the contact arm 114 to the position not shown removes the memory capacitor 23 from the hydrocarbon detector and applies it to a regulated power supply which comprises the rectifier circuit including the zener diode 50. The memory capacitor 23 is charged in the same manner as described with reference to the first mode through a resistor 115 and a variable resistor 116. The variable resistor 116 is provided to adjust the time needed to charge the capacitor to the predetermined value of 2.5 volts to thereby compensate for the 0.012 coefficient of the equation for converting the Mobil cycle to the California cycle.

When the memory capacitor 23 reaches the predetermined value, the Schmidt trigger comprising transistors 31, 27 is actuated in the manner described with reference to the first mode to turn off the power amplifier 30 and thus deactivate the relay 36 to move its contacts 37, 38 to the position shown in FIG. 2. As described with reference to the first mode, movement of the contact arm 37 to the position shown removes power from the relay 109, and thus deactivates the relay 109 to move the contact arms 112, 113, 114 to the position shown in FIG. 2. As described with reference to the first mode, when the contact arm 113 moves to the position shown it acts to remove power from the coil 86 and thus permits the biased brake to stop the motor 89. Thus, the scale on the drum will now indicate the sum of the $0.0081X_2$ and $0.012X_1$ terms of the Mobil equation.

The circuit of FIG. 2 automatically is set for the third mode of the Mobil cycle. After a slight delay to ensure that the second mode reading has been recorded or indicated on the drum driven by the motor 89, the vehicle is decelerated from 60 m.p.h. as described hereinabove. The relays 102, 130 have been actuated as described hereinabove. However, the actuation of the Schmidt trigger comprising the transistors 31, 32 does not deactivate relays 102, 130 which continue to receive power through the contact arms 73 and 90 in the position shown. When the relay 102 is actuated, its switch arms 105, 106, 107 are moved to the position not shown. The contact arm 105 acts as a latching arm to maintain power to the relay coils 102, 130 from the 120 VAC power supply 92, 93. The movement of the contact arm 107 to the position now shown places a diode 101 in the circuit between the potentiometer 22 and the memory capacitor 23 which comprises line 54, a resistor 108 and diode 101, the contact arms 98, 107, 102 in the position shown and a line 55.

The capacitor 133 is selected to discharge the capacitor 23 to a slight value below 2.5 volts to thus reset the Schmidt trigger 31, 27. In the first two modes, the capacitor 23 will follow the output of the current amplifier 21. In the third mode, the diode will only permit the capacitor 23 to be discharged to the lowest voltage output of the hydrocarbon detector of FIG. 3 and thus indicate the peak percent absorption.

The relay 130 is provided in the circuit to close contact arm 131 when the relay 130 is actuated. Closure of the contact arm 131 shorts out, by lines 56, 57, a portion of a resistor 34 to compensate for the additional voltage drop in the circuit as a result of the diode 101.

When the contact arm 106 of the relay 102 is moved to the position not shown, another regulated power supply comprising a transformer 46, diodes 45, 51, zener diodes 40, 43 and a transistor 42 applies a plus regulated voltage along a line 62, through the closed contact 106 and through a resistor 65 to the emitter of a unijunction transistor 67. The unijunction transistor 67 forms part of a timer circuit which also comprises a pair of capacitors 66, 71. The timer circuit is set to actuate the coil of a relay 67 after a predetermined period of time, such as 20 seconds. The predetermined time is chosen to be sufficiently long to insure that the third mode of the Mobil cycle has been completed.

Actuation of the relay 68 moves the contact arms 72, 73 to the positions not shown. Movement of the contact arm 73 to the position not shown removes power from the relays 102, 130 and thus deactivates these relays. Movement of the contact arm 72 to the position not shown applies power to a relay 93 from the 120 VAC power source 91, 92 by line 78', the line 60, the normally closed contact arm 37, the line 59, the normally closed switch arm 74, the relay 93, the contact arm 72, a line 82', and the line 83'.

Thus, the relay 93 is actuated to move the contact arms 96, 97, 98 to the positions not shown. Actuation of the relay 93 acts to read out the peak voltage stored on the memory capacitor 93 in a manner similar to that described hereinabove with respect to the first and second modes. Specifically, the contact arm 96 acts to hold power in the relay 93, and the contact arm 97 acts to actuate the coil 86 to remove the normally biased brake from the motor 89 to permit the motor to turn. Movement of the contact arm 98 removes the memory capacitor 23 from the hydrocarbon detector input and connects it to a charging voltage circuit comprising the line 55, the contact arms 122, 114, and 98, the resistor 99 and a variable resistor 100, the line 64 which is connected to the output of the regulated voltage supply which comprises the zener diode 50. The variable resistor 100 acts to compensate for the 0.014 coefficient of the equation to convert the Mobil cycle to the California cycle. Thus, the memory capacitor 23 is charged from the crest voltage impressed thereon until the capacitor reaches a predetermined value, e.g. 2.5 volts, at which time the Schmidt trigger 31, 27 operates the power amplifier 30, to move the contact arms 37, 38 to the position shown in FIG. 2 and thus remove power from the relay 93. Removal of power from the relay 93 acts to move the contact arms 96, 97, 98 to the position shown, and thus stop the drum or motor 89. At this time, the scale on the drum will indicate the sum of the terms $0.0081X_2$, $0.012X_1$, and $0.014X_3$ of the Mobil equation.

Then, pushbuttons 81, 82 are actuated to apply power to a relay 80 from the 120 VAC power supply 91, 92 by way of contact arm 90 in the position not shown, and the line 83'. The actuation of the relay 80 moves contact arms 83, 84 and 85 to the position not shown. Contact arm 83 acts as a holding arm to maintain power on the relay 80. Contact arm 84 acts to actuate the coil 86 to remove the normally biased brake from the motor 89. Contact arm 85 acts to reverse the polarity of the motor 89 and thus drive the motor 89 back. When the motor hits a stop, it actuates a microswitch to move contact arm 90 to remove power from relay 80 and thus condition the circuit to begin a new cycle.

Lamps 94, 103, and 140 are provided in the circuit to indicate, by being in a lighted state, whenever their corresponding relays 93, 102 and 130, 117 are actuated. A lamp 132 is provided to indicate when the timer including the unijunction transistor 67 has rundown and supplied power to the relay 93. A lamp 141 is provided to indicate that the 120 VAC power supply is connected to the system of FIG. 2.

A suitable unit for the hydrocarbon detector 10 is the Honeywell Active Hydrocarbons Detector, manufactured by Honeywell Inc., Minneapolis, Minn., and described in pamphlet 59–0616 9/66. The Honeywell hydrocarbons detector is schematically shown in FIG. 3. The Honeywell detector 206 receives the sample from a pump unit 201. The sample enters pump unit 201 by way of intake 202, which is connected into the exhaust pipe (not shown) of an automobile; and through a condensate trap 203 where a substantial amount of moisture is removed from the sample stream. The sample exhaust stream is then drawn through filter 204 to remove particles from the stream. The filtered stream then enters a pump 205 and is pumped via a conduit 217 to the detector unit 206. The sample stream passes through a sample chamber 212 and exhausts to the atmosphere through conduit 216.

The detector unit 206 comprises an ultraviolet light source 211 and an ultraviolet light detector 213 which are placed on opposite sides of the sample chamber 212. A power supply 208 supplies power to the ultraviolet light source 211 through a variable resistor 209. The path of the ultraviolet light is shown by the dashed line passing through the sample chamber 212. The sample stream absorbs ultraviolet energy in direct proportion to the concentration of ultraviolet-absorbing hydrocarbons in the sample stream. The ultraviolet light is sensed by the detector 213 which generates an output signal representative of the concentration of the ultraviolet emission detected reached by the detector 213. The output from the ultraviolet detector 213 is indicative of the count rate of the ultraviolet light sensed by detector 13. Thus, the higher the concentration of hydrocarbons the lower the count rate, if the concentration of the hydrocarbons increases the count rate output of the detector 213 decreases. Conversely, if the concentration of the hydrocarbons decreases, a higher count rate will be produced.

The signal representative of the count rate are fed to a count integrator 214, which comprises a solid-state pulse amplifier (not shown), where a square wave of constant amplitude and duration for each count of the detector 213 is produced. The count integrator 214 also includes a integrated circuit which provides a smoothed DC output which is proportional to the number of pulses per second received from the detector 213. The smoothed DC output is applied to meter 215 for display and also to the resistor 20 (FIG. 2) which interconnects the detector unit 10 and the emitter follower 21 (FIG. 2).

The specific embodiment of FIG. 2 may be readily modified to compute other rapid cycles, such as the New Jersey cycle described hereinabove. To carry out the New Jersey cycle, two additional relay and resistor circuits may be provided for charging the capacitor 23 by the detector 10 and the rectifier circuit in the same manner as in the first and second modes of the Mobil cycle, and used in place of the relay and resistor circuit of the third mode of the Mobil cycle. The New Jersey cycle would also require a linear scale in place of the natural log scale.

Further, the specific embodiment may be readily modified to be responsive to a hydrocarbon detector which generates an output signal in direct proportion to the p.p.m. count of hydrocarbons.

The following table lists suitable components for the special purpose computer shown in FIG. 2.

TABLE

| Numeral | Resistance (ohms) | Numeral | Capacitance (microfarads) |
| --- | --- | --- | --- |
| 20 | 47.0K | 33 | 15 |
| 22 | 100.0K | 44 | 500 |
| 24 | 100.0 | 49 | 8 |
| 26 | 2.2K | 66 | 100 |
| 28 | 4.7K | 71 | 100 |
| 33 | 2.2K | 87 | 5 |
| 34 | 10.0K | 133 | 1 |
| 35 | 7.5K | 135 | 25 |
| 39 | 10.0 | | |
| 40 | 1.0K | | |
| 52 | 100.0K | | |
| 52' | 1.0M | | |
| 53 | 51.0K | | |
| 65 | 200.0K | | |
| 69 | 330.0 | | |
| 70 | 10.0K | | |
| 99 | 1,970.0K | | |
| 100 | 1.0M | | |
| 108 | 10.0K | | |
| 115 | 1,680.0K | | |
| 116 | 1.0M | | |
| 123 | 470.0K | | |
| 124 | 1.0M | | |
| 133' | 100.0 | | |
| 136 | 10.0K | | |
| 137 | 6.8K | | |

| Numeral | Component |
| --- | --- |
| 21 | 2N2925 |
| 27 | 2N2925 |
| 29 | 1N459A |
| 30 | 2N527 |
| 31 | 2N2925 |
| 36 | 175-ohm coil DPDT |
| 41 | 3.3 v. zener |
| 42 | 2N1183 |
| 43 | 12 v. zener |
| 45 | 1N3640 |
| 46 | 12 VAC |
| 47 | 115 VAC |
| 48 | 1N3640 |
| 50 | 62 v. zener |
| 67 | 2N1671A |
| 68 | 175-ohm coil DPDT |
| 75 | 250-ohm coil reed relay |
| 80 | 120 VAC—3PDT |
| 89 | 4 r.p.m. Synchronous |
| 93 | 120 VAC—3PDT |
| 102 | 120 VAC—3PDT |
| 109 | 120 VAC—3PDT |
| 117 | 120 VAC—3PDT |

What is claimed is:

1. Apparatus for determining the total hydrocarbon emissions count of an engine when operated through a plurality of modes including acceleration, deceleration and cruise comprising, in combination:

means for generating a signal representative of the hydrocarbon emission count of the engine, means including capacitor means for storing a voltage representative of said signal, means for changing said capacitor means from said stored voltage to a predetermined voltage, means for adjusting the rate of changing said capacitor means by one of a plurality of predetermined factors corresponding to the plurality of modes, means for generating a function of the time taken to change said capacitor means from said stored voltage to said predetermined voltage, and means responsive to said time function generating means for indicating the sum of hydrocarbon counts for the plurality of modes as modified by their respective predetermined factors.

2. The apparatus of claim 1 wherein said sum indicating means comprises means responsive to said time function generating means for driving a scale whenever said capacitor means is being changed to said predetermined voltage.

3. The apparatus of claim 1 wherein said adjusting means comprises a plurality of resistors which are selectively placed in circuit with said capacitor means.

4. The apparatus of claim 1 wherein said sum indicating means comprises a synchronous motor actuable whenever said capacitor means is being changed to said predetermined voltage.

5. The apparatus of claim 1 wherein said changing means further comprises a trigger circuit actuable by said predetermined voltage for removing said changing means from said capacitor means.

6. A method of determining the hydrocarbon emissions count of an engine comprising the steps of:
 a. operating the engine through one of a plurality of modes including acceleration, deceleration and cruise,
 b. generating a signal representative of the hydrocarbon emission count for the mode of step (a),
 c. storing said hydrocarbon count signal as a voltage on capacitor means,
 d. changing said capacitor from said stored voltage to a predetermined voltage,
 e. adjusting the rate of change in step (d) by a predetermined factor for the mode of step (a),
 f. generating a function representative of the amount of time to change the capacitor from said stored voltage to said predetermined voltage,
 g. displaying, in response to said time function, a representation of the hydrocarbon count of the mode of step (a) as modified by said predetermined factor,
 h. repeating steps (a) through (f) for another of said modes,
 i. displaying, in response to step (h), a representation of the sum of the hydrocarbon counts of the modes as modified by respective predetermined factors, and
 j. repeating steps (a) through (i) for each of the remaining modes.

7. The method of claim 6 wherein step (e) includes selectively placing one of a plurality of resistors in circuit with said capacitor means.

8. The method of claim 6 wherein step (g) comprises driving a scale whenever said capacitor means is being changed to said predetermined voltage.

9. The method of claim 6 wherein step (g) comprises actuating a synchronous motor whenever said capacitor means is being charged to said predetermined voltage.

* * * * *